(12) United States Patent
Liu (10) Patent No.: US 11,772,931 B2
(45) Date of Patent: Oct. 3, 2023

(54) METHOD FOR INTELLIGENT CONTROL OF AN ELEVATOR AND DEVICE USING THE SAME (71) Applicant: HON HAI PRECISION INDUSTRY CO., LTD., New Taipei (TW)

(72) Inventor: Shiaw-Herng Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 725 days.

(21) Appl. No.: 16/908,941

(22) Filed: Jun. 23, 2020

(65) Prior Publication Data
US 2021/0130124 A1 May 6, 2021

(30) Foreign Application Priority Data
Nov. 1, 2019 (CN) .......................... 201911060147.9

(51) Int. Cl.
*B66B 1/24* (2006.01)
*G06V 20/52* (2022.01)
*G06V 40/10* (2022.01)
*G06V 10/764* (2022.01)
(Continued)

(52) U.S. Cl.
CPC .......... *B66B 1/2408* (2013.01); *G06V 10/255* (2022.01); *G06V 10/764* (2022.01); *G06V 10/82* (2022.01); *G06V 20/52* (2022.01); *G06V 40/10* (2022.01); *B66B 2201/21* (2013.01); *B66B 2201/211* (2013.01); *B66B 2201/24* (2013.01); *B66B 2201/405* (2013.01); *B66B 2201/4669* (2013.01)

(58) Field of Classification Search
CPC ............. B66B 1/2408; B66B 2201/21; B66B 2201/211; B66B 2201/24; B66B 2201/405; B66B 2201/4669; B66B 2201/104; B66B 1/06; B66B 1/34; B66B 2201/222; G06V 10/255; G06V 10/764; G06V 10/82; G06V 20/52; G06V 40/10; G06F 18/2431; G06N 3/08
See application file for complete search history.

(56) References Cited

U.S. PATENT DOCUMENTS 10,597,255 B2 * 3/2020 Chapman ............... B66B 1/3461
2004/0022439 A1 * 2/2004 Beardsley ............... B66B 1/468
382/173

(Continued)

FOREIGN PATENT DOCUMENTS

| CN | 102616614 | 8/2012 |
|----|-----------|--------|
| CN | 103723588 | 4/2014 |

(Continued)

*Primary Examiner* — Jeffrey Donels
(74) *Attorney, Agent, or Firm* — ScienBiziP, P.C.

(57) ABSTRACT

A method for intelligent control of an elevator to give priority to a floor containing the total highest priority of passengers acquires first images taken by first cameras, identifies targets in the first images, and determines priority levels of the targets. In response to receiving a plurality of first service signals from a number of floors in a building, the method controls a driving unit to drive an elevator to move to service the passengers as targets with a highest total priority level according to individual priority levels of the targets within a group of passengers waiting on each floor of the building.

17 Claims, 4 Drawing Sheets

(51) Int. Cl.
*G06V 10/82* (2022.01)
*G06V 10/20* (2022.01)

(56) References Cited

U.S. PATENT DOCUMENTS

| | | | |
|---|---|---|---|
| 2012/0020518 A1* | 1/2012 | Taguchi | G06T 7/292 |
| | | | 382/103 |
| 2015/0266700 A1* | 9/2015 | Salmikuukka | B66B 1/468 |
| | | | 187/380 |
| 2020/0031618 A1* | 1/2020 | Singaraju | B66B 5/0012 |
| 2021/0130124 A1* | 5/2021 | Liu | G06V 20/52 |

FOREIGN PATENT DOCUMENTS

| | | | | |
|---|---|---|---|---|
| CN | 108163654 | | 6/2018 | |
| CN | 109693980 | | 4/2019 | |
| CN | 110316622 | | 10/2019 | |
| EP | 3835245 A1 * | | 6/2021 | B66B 1/2408 |
| JP | 05078045 | | 3/1993 | |

* cited by examiner

METHOD FOR INTELLIGENT CONTROL OF AN ELEVATOR AND DEVICE USING THE SAME

This application claims priority to Chinese Patent Application No. 201911060147.9 filed on Nov. 1, 2019, the contents of which are incorporated by reference herein.

FIELD

The subject matter herein generally relates to a method for intelligent control of an elevator and a device using the same.

BACKGROUND

Passengers waiting for elevators have different degrees of urgency depending on their needs. However, current elevator systems do not take into account the urgency of passenger's needs, resulting in urgent passengers on different floors being delayed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage devices. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
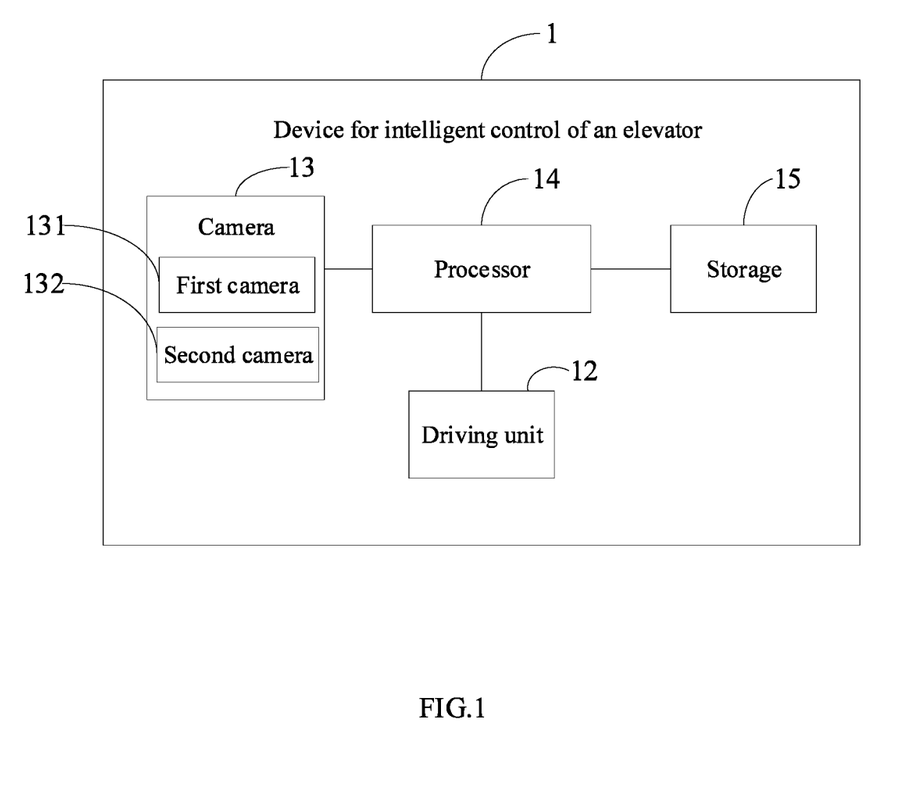
FIG. 1 is a block diagram of an embodiment of a running environment of a method for intelligent control of an elevator.

FIG. 1 illustrates a running environment of a method for intelligent control of an elevator. The method is applied in a device 1 for intelligent control of an elevator. The device 1 includes a driving unit 12, a camera 13, a processor 14, and a storage 15. In one embodiment, the processor 14 connects to the driving unit 12, the camera 13, and the storage 15. The driving unit 12 connects to an elevator and is used to drive the elevator to move between the floors. In one embodiment, the driving unit 12 is a motor. The camera 13 includes a first camera 131 and a second camera 132. The first camera 131 captures images or videos from corridor or lift lobby of each floor. In one embodiment, the first camera 131 is installed on an elevator door of each floor or on the wall of each floor. The first camera 131 captures first images or first videos of passengers waiting for the elevator and transmits the first images or the first videos to the processor 14 in order to process the first images or first videos for analysis. In one embodiment, the second camera 132 captures second images or second videos of passengers in the elevator. The second camera 132 transmits the second images or second videos to the processor 14.

In the embodiment, the processor 14 can be a central processing unit, or a common processor, a digital signal processor, a dedicated integrated circuit, ready-made programmable gate arrays or other programmable logic devices, discrete door or transistor logic devices, discrete hardware components, and so on. In another embodiment, the processor 14 can be a microprocessor or any conventional processor. The processor 14 can also be a control center of the device 1, using various interfaces and lines to connect the various parts of the device 1.

The storage 15 stores data of the device 1. In at least one exemplary embodiment, the storage 15 can include various types of non-transitory computer-readable storage mediums. For example, the storage 15 can be an internal storage system of the device 1, such as a flash memory, a random access memory (RAM) for temporary storage of information, and/or a read-only memory (ROM) for permanent storage of information. In another embodiment, the storage 15 can also be an external storage system, such as a hard disk, a storage card, or a data storage medium.

Figure 2:
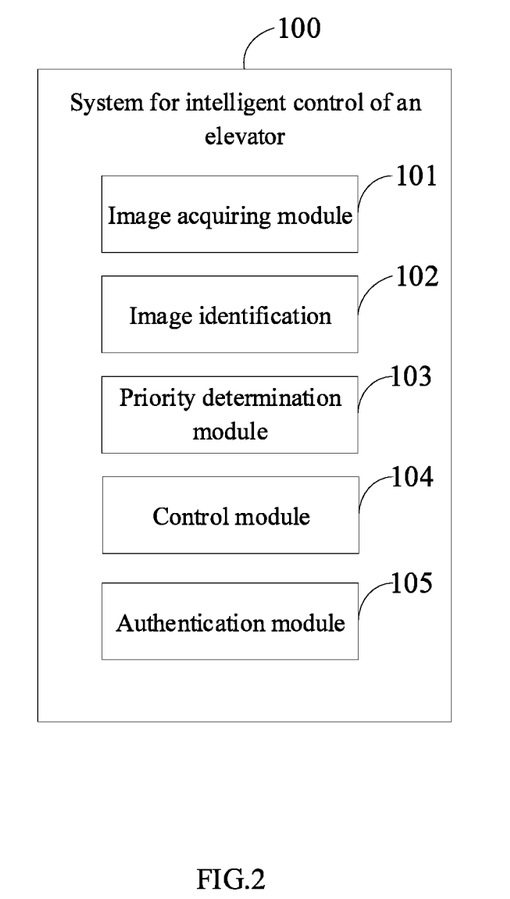
FIG. 2 is a block diagram of an embodiment of a system for intelligent control of an elevator.

FIG. 2 illustrates a system 100 for intelligent control of an elevator. In the embodiment, the system 100 includes one or more modules, which are running in the device 1. In one embodiment, the system 100 includes an image acquiring module 101, an image identification 102, priority determination module 103, a control module 104, and an authentication module 105. In one embodiment, the modules 101-105 of the system 100 can be collections of software instructions. In the present embodiment, the image acquiring module 101, the image identification 102, the priority determination module 103, the control module 104, and the authentication module 105 are stored in the storage 15 of the device 1 and executed by the processor 14. In another embodiment, the image acquiring module 101, the image identification 102, the priority determination module 103, the control module 104, and the authentication module 105 are program segments or code in the processor 14 of the device 1.

The image acquiring module 101 acquires the first images taken by the first cameras 131.

In one embodiment, the first cameras 131 are installed on all floors, and a scene capturable by each first camera 131 is a certain area in front of the elevator, and human bodies or objects in the front area of the elevator may be considered to be waiting for the elevator, and the human bodies or objects may be used as targets. The image acquiring module 101 acquires the first images including the target.

The image identification 102 identifies the targets in the first images.

In one embodiment, the image identification 102 identifies the targets in the first images by means of an image recognition algorithm such as a feature recognition algorithm, a machine learning algorithm, or a deep learning algorithm. In one embodiment, the image identification 102 divides the first images into a number of blocks, identifies whether targets exist in one or more of the number of blocks by the image recognition algorithm. In one embodiment, the image identification 102 divides the first images into the number of blocks according to characteristics of pixel values of the first images, and differences between the pixel values of each block and the pixel values of surrounding adjacent blocks exceed a preset threshold.

In one embodiment, when identifying each block by the image recognition algorithm, the image identification 102 acquires at least one neural network model, wherein each neural network model is used to identify one target, each neural network model is trained by a training sample set of a neural network model. The training sample set includes multiple sample pairs, each sample pair includes a training image including one target and one outline of the target in the training image. In one embodiment, the training image is used as an input of the neural network model, the outline of the target in the training image is used as an output of the neural network model, and the neural network model trains the training images to output the outline of the target in the training image. When acquiring the at least one neural network model, the first images are respectively input in each neural network model to determine whether one target is existing in the first images.

The priority determination module 103 determines priority levels of the targets.

Figure 3:
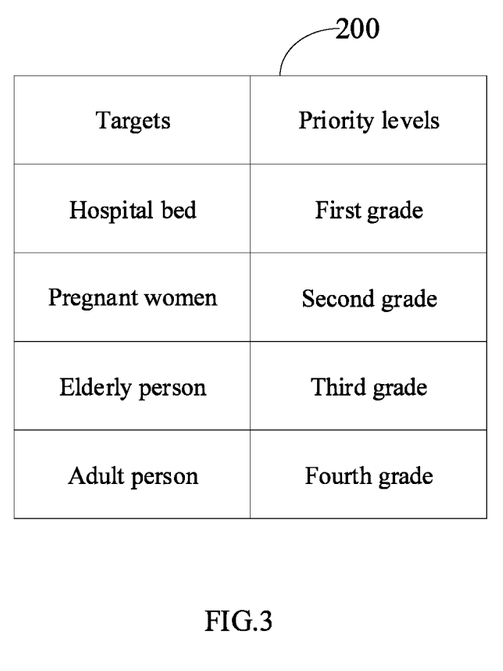
FIG. 3 is a diagram of an embodiment of a priority relationship table.

In one embodiment, the priority determination module 103 determines the priority levels of the targets by querying a priority relationship table 200. FIG. 3 illustrates the priority relationship table 200. The priority relationship table 200 records a correspondence relation between a number of the targets and a number of priority levels. The correspondence relation between each target and one priority level is set according to priority or demand levels of the targets. In one embodiment, the system 100 can be applied in a hospital's elevator system, the priority relationship table 200 defines a priority level of a hospital bed as a first grade, defines a priority level of pregnant women as a second grade, defines a priority level of an elderly person as a third grade, and defines a priority level of an adult person as a fourth grade.

In one embodiment, when there are multiple targets in the first images, the priority determination module 103 determines priority level of each target and prioritizes the highest priority level among multiple targets as the priority level of the targets in the first images. For example, if the multiple targets include a hospital bed, an elderly person, a pregnant woman, the priority determination module 103 respectively determines the priority level of the hospital bed, the priority level of the elderly person, and the priority level of the pregnant women according to the priority relationship table 200, and prioritizes the highest priority level among such multiple targets.

In one embodiment, when the targets in the first images are multiple, the priority determination module 103 scores each target of all the targets, calculates a total score of the targets according to the score of each target, and determines the priority level of the targets according to the total scores. In one embodiment, the priority determination module 103 queries a score and priority relationship table to determine the priority level of the targets corresponding to the total score of the targets, wherein the score and priority relationship table records correspondence relation between a number of total scores and a number of priority levels of the targets.

In response to a number of first service signals from multiple floors in a building, the control module 104 controls the driving unit 12 to drive the elevator to move to service the targets with the highest priority level according to the priority levels of the targets on different floors of the building.

In one embodiment, a service button is set on an elevator port on each floor of the building, the first service signal can be generated when a user triggers the service button. In one embodiment, the priority levels of the targets on floors 4, 6, and 8 are respectively the first grade, the second grade, and the third grade, so the priority level of the targets on floor 4 is the highest. When receiving a number of first service signals from floor 4, floor 6, and floor 8, the control module 104 controls the driving unit 12 to drive the elevator to move the elevator to service the targets on floor 4 according to the priority levels of the targets on floor 4, floor 6, and floor 8.

In one embodiment, the control module 104 counts time after receiving the first service signals, and increases the priority level of the targets of a target floor when an elapsed time period corresponding to the first service signal of the target floor is more than a preset duration. In one embodiment, the control module 104 prioritizes the priority level of the targets of the target floor as the first grade when the timing corresponding to the first service signal of the target floor is more than the preset duration, thus avoiding a long wait by the targets on the target floor and improving user experience.

In one embodiment, the control module 104 acquires second images taken by the second camera 132 set in the elevator, determines whether one person emerges in the elevator, ignores a second service signal generated in the elevator when no passengers are detected in the elevator, and controls the elevator response to the first service signal. The present disclosure avoids controlling the elevator to respond to the second service signal when no one is detected in the elevator and saves resources.

The authentication module 105 acquires user information and determines whether the user information has service permissions, and responds to the user's pressing operation on the service button to generate the first service signal when the user information has service permissions. In one embodiment, the user information is facial information, the authentication module 105 acquires the user's facial information by the first camera 131, and determines whether the user's face information has service permissions, and generates the first service signal when the user's face information has service permissions. In one embodiment, the user information is fingerprint information or iris information. The authentication module 105 can acquire user's fingerprint information by a fingerprint reader and can acquire the user's iris information by an iris recognizer and can determine whether the fingerprint information or iris information has service permissions. The first service signal is generated when the fingerprint information or iris information is found to have service permissions. The present disclosure avoids a non-privileged user from using the elevator by identifying user information.

Figure 4:
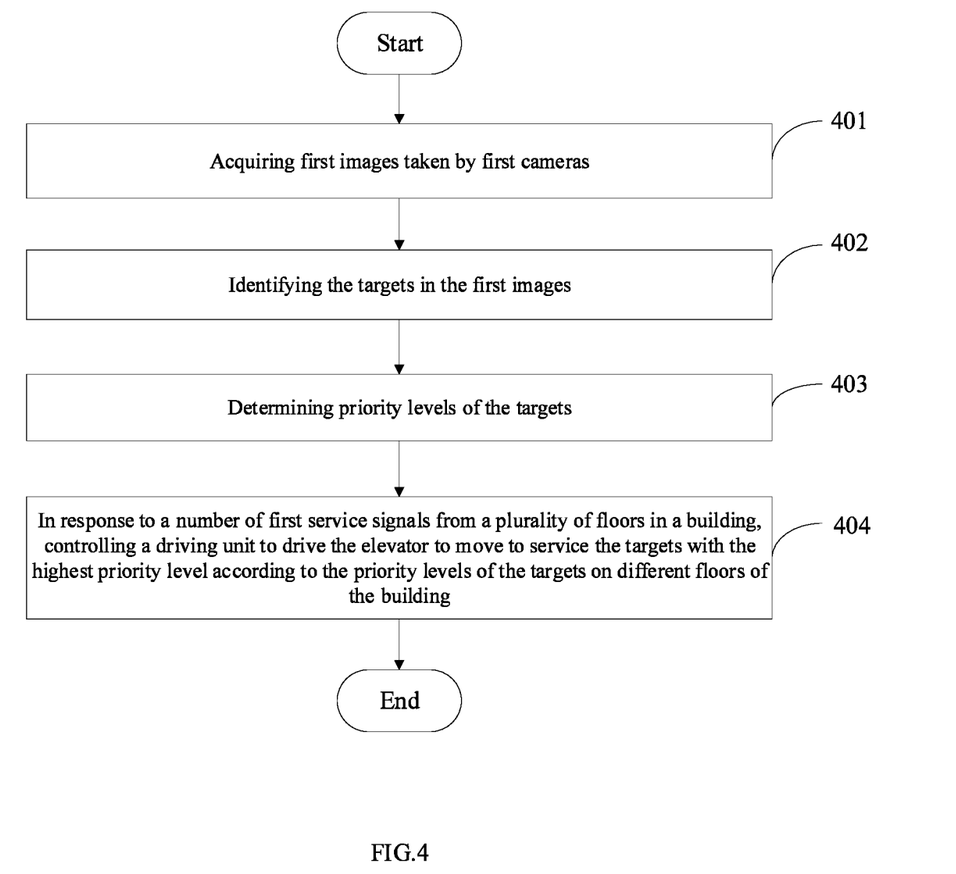
FIG. 4 is a flowchart of an embodiment of the method for intelligent control of an elevator.

FIG. 4 illustrates a flowchart of an embodiment of a method for intelligent control of an elevator. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, acquiring first images taken by first cameras.

In one embodiment, the first cameras are installed on all floors, and a capturable area of each first camera is a certain area in front of the elevator, and human bodies or objects in the front area of the elevator may be considered to be waiting for the elevator, and the human bodies or objects may be regarded as targets. A device acquires the first images including the target.

At block 402, identifying the targets in the first images.

In one embodiment, the device identifies the targets in the first images by means of an image recognition algorithm such as a feature recognition algorithm, a machine learning algorithm, or a deep learning algorithm. In one embodiment, the device divides the first images into a number of blocks, identifies whether targets exist in one or more of the number of blocks by the image recognition algorithm. In one embodiment, the device divides the first images into the number of blocks according to characteristics of pixel values of the first images, and differences between the pixel values of each block and the pixel values of surrounding adjacent blocks in relation to a preset threshold.

In one embodiment, when identifying each block by the image recognition algorithm, the device acquires at least one neural network model, wherein each neural network model is used to identify one target. Each neural network model is trained by a training sample set of the neural network model, the training sample set includes multiple sample pairs, each sample pair includes a training image including one target and one outline of the target in the training image. In one embodiment, the training image is used as an input of the neural network model, the outline of the target in the training image is used as an output of the neural network model, and the neural network model trains the training images to output the outlines of targets in the training image. When acquiring the at least one neural network model, the first images are respectively input in each neural network model to determine whether one target is existing in the first images.

At block 403, determining priority levels of the targets.

In one embodiment, the device determines the priority levels of the targets by querying a priority relationship table. The priority relationship table records a correspondence relation between a number of the targets and a number of priority levels. The correspondence relation between each target and one priority level is set according to priority or demand levels of the targets. In one embodiment, the priority relationship table defines a priority level of a hospital bed object as a first grade, defines a priority level of pregnant women as a second grade, defines a priority level of an elderly person as a third grade, and defines a priority level of an adult person as a fourth grade.

In one embodiment, when the targets in the first images are multiple, the device determines priority level of each target and prioritizes the highest priority level of multiple targets as the priority level of the targets in the first images. For example, the multiple targets include a hospital bed, an elderly person, a pregnant woman, the device respectively determines the priority level of the hospital bed, the priority level of the elderly person, and the priority level of the pregnant women according to the priority relationship table, and prioritizes the highest priority level among the priority levels of the hospital bed, the elderly person, the pregnant women as the priority level of the multiple targets.

In one embodiment, when the targets in the first images are multiple, the device awards a score of each target of all the targets, calculates a total score of the targets according to the score of each target, and determines the priority level of the targets according to the total score of the targets. In one embodiment, the device queries a score and priority relationship table to determine the priority level of the targets corresponding to the total score of the targets, wherein the score and priority relationship table records correspondence relation between a number of total scores and a number of priority levels of the targets.

At block 404, in response to a number of first service signals from a plurality of floors in a building, controlling a driving unit to drive the elevator to move to service the targets with the highest priority level according to the priority levels of the targets on different floors of the building.

In one embodiment, a service button is set on an elevator port on each floor of the building, the first service signal can be generated the when user triggers the service button. In one embodiment, the priority levels of the targets on floors 4, 6, and 8 are respectively the first grade, the second grade, and the third grade, so the priority level of the targets on floor 4 is the highest. When receiving a number of first service signals from floor 4, floor 6, and floor 8, the device controls the driving unit to drive the elevator to move the elevator to service the targets on floor 4 according to the priority levels of the targets on floor 4, floor 6, and floor 8.

In one embodiment, the device counts time after receiving the first service signals, and increases the priority level of the targets of a target floor when an elapsed time period corresponding to the first service signal of the target floor is more than a preset duration. In one embodiment, the device prioritizes the priority level of the targets of the target floor as the first grade when the timing corresponding to the first service signal of the target floor is more than the preset duration, thus avoiding long waiting for the targets on the target floor and improving user experience.

In one embodiment, the device acquires second images taken by a second camera set in the elevator, determines whether the elevator is empty, and ignores a second service signal generated in the elevator when no one is detected in the elevator, and controls the elevator to respond to the first service signal. The present disclosure avoids controlling the elevator to respond to the second service signal when no one is detected in the elevator and saves resources.

In one embodiment, the method further includes: acquiring user information and determining whether the user has service permissions. When the user has service permissions, the method responds to that user's pressing operation on the service button to generate the first service signal. In one embodiment, the user information is face information, the device acquires user's face information by the first camera, and determines whether such user has service permissions, and generates the first service signal when the user has service permissions. In one embodiment, the user information is fingerprint information or iris information, the device acquires user's fingerprint information by a fingerprint reader or acquires user's iris information by an iris recognizer The device determines through fingerprint information or iris information whether such user has service permissions, and generates the first service signal when the fingerprint information or iris information indicate service permissions. The present disclosure avoids a non-privileged or non-authorized user using the elevator.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A device for intelligent control of an elevator comprising:
   a driving unit;
   a plurality of first cameras;
   a processor coupled to the driving unit, the plurality of the first cameras;
   a non-transitory storage medium coupled to the processor and configured to store a plurality of instructions, which cause the processor to:
     acquire first images taken by the plurality of first cameras;
     identify targets in the first images;
     determine priority levels of the targets; and
     in response to receiving a plurality of first service signals from a plurality of floors in a building, count time after receiving the plurality of the first service signals; and increase a priority level of the targets of a target floor when an elapsed time period corresponding to a first service signal of the target floor is more than a preset duration, and control the driving unit to drive the elevator to move to service the targets with a highest priority level according to priority levels of the targets on different floors of the building.

2. The device for intelligent control of an elevator according to claim 1, wherein the plurality of instructions further cause the processor to:
   divide the first images into a plurality of blocks; and
   identify whether the targets exist in one or more of the plurality of blocks using an image recognition algorithm.

3. The device for intelligent control of an elevator according to claim 2, wherein the plurality of instructions further cause the processor to:
   divide the first images into the plurality of blocks according to characteristics of pixel values of the first images, wherein difference between the pixel values of each block and the pixel values of surrounding adjacent blocks with the each block exceed a preset threshold.

4. The device for intelligent control of an elevator according to claim 1, wherein the plurality of instructions further cause the processor to:
   determine the priority levels of the targets by querying a priority relationship table, wherein the priority relationship table records a correspondence relation between a plurality of the targets and a plurality of priority levels.

5. The device for intelligent control of an elevator according to claim 1, wherein the plurality of instructions further cause the processor to:
   score each target of the targets, calculate a total score of the targets according to the score of each target, and determine the priority level of the targets according to the total score of the targets.

6. The device for intelligent control of an elevator according to claim 1, wherein the plurality of instructions further cause the processor to:
   acquire second images taken by a second camera set in the elevator;
   determine whether one person is detected in the elevator based on the second images;
   ignore a second service signal generated in the elevator when no person is detected in the elevator; and
   control the elevator response to the first service signal.

7. A method for intelligent control of an elevator comprising:
   acquiring first images taken by a plurality of first cameras;
   identifying targets in the first images;
   determining priority levels of the targets; and
   in response to a plurality of first service signals from a plurality of floors in a building, counting time after receiving the plurality of the first service signals; and increasing a priority level of the targets of a target floor when an elapsed time period corresponding to a first service signal of the target floor is more than a preset duration, and controlling a driving unit to drive the elevator to move to service the targets with a highest priority level according to priority levels of the targets on different floors of the building.

8. The method for intelligent control of an elevator according to claim 7, further comprising:
   dividing the first images into a plurality of blocks; and
   identifying whether the targets exist in one or more of the plurality of blocks by an image recognition algorithm.

9. The method for intelligent control of an elevator according to claim 8, further comprising:
   dividing the first images into the plurality of blocks according to characteristics of pixel values of the first images, wherein difference between the pixel values of each block and the pixel values of surrounding adjacent blocks with the each block exceed a preset threshold.

10. The method for intelligent control of an elevator according to claim 8, further comprising:
    determining the priority levels of the targets by querying a priority relationship table, wherein the priority relationship table records a correspondence relation between a plurality of the targets and a plurality of priority levels.

11. The method for intelligent control of an elevator according to claim 8, further comprising:
    scoring each target of the targets, calculating a total score of the targets according to the score of each target, and determining the priority level of the targets according to the total score of the targets.

12. The method for intelligent control of an elevator according to claim 8, further comprising:
- acquiring second images taken by a second camera set in the elevator;
- determining whether one person is detected in the elevator based on the second images;
- ignoring a second service signal generated in the elevator when no person is detected in the elevator; and
- controlling the elevator response to the first service signal.

13. A non-transitory storage medium having stored thereon instructions that, when executed by at least one processor of a device for intelligent control of an elevator, causes the least one processor to execute instructions of a method for intelligent control of an elevator, the method for intelligent control of an elevator comprising:
- acquiring first images taken by a plurality of first cameras;
- identifying targets in the first images;
- determining priority levels of the targets; and
- in response to a plurality of first service signals from a plurality of floors in a building, counting time after receiving the plurality of the first service signals; and increasing a priority level of the targets of a target floor when an elapsed time period corresponding to a first service signal of the target floor is more than a preset duration, and controlling a driving unit to drive the elevator to move to service the targets with a highest priority level according to priority levels of the targets on different floors of the building.

14. The non-transitory storage medium as recited in claim 13, wherein the method for intelligent control of an elevator further comprising:
- dividing the first images into a plurality of blocks; and
- identifying whether the targets exist in one or more of the plurality of blocks by an image recognition algorithm.

15. The non-transitory storage medium as recited in claim 14, wherein the method for intelligent control of an elevator further comprising:
- dividing the first images into the plurality of blocks according to characteristics of pixel values of the first images, wherein difference between the pixel values of each block and the pixel values of surrounding adjacent blocks with the each block exceed a preset threshold.

16. The non-transitory storage medium as recited in claim 13, wherein the method for intelligent control of an elevator further comprising:
- determining the priority levels of the targets by querying a priority relationship table, wherein the priority relationship table records a correspondence relation between a plurality of the targets and a plurality of priority levels.

17. The non-transitory storage medium as recited in claim 13, wherein the method for intelligent control of an elevator further comprising:
- scoring each target of the targets, calculating a total score of the targets according to the score of each target, and determining the priority level of the targets according to the total score of the targets.

* * * * *